United States Patent [19]

Lausberg

[11] 4,455,108

[45] Jun. 19, 1984

[54] ANCHORING SYSTEM FOR A SEA STATION SUPPORTED ON FLOATING BODIES

[75] Inventor: Helmut Lausberg, Oberhausen, Fed. Rep. of Germany

[73] Assignee: M.A.N. Maschinenfabrik Augsburg-Nurnberg Aktiengesellschaft, Fed. Rep. of Germany

[21] Appl. No.: 345,412

[22] Filed: Feb. 3, 1982

[30] Foreign Application Priority Data

Feb. 10, 1981 [DE] Fed. Rep. of Germany ....... 3104570

[51] Int. Cl.$^3$ ............................................. E02B 17/00
[52] U.S. Cl. ..................................... 405/202; 285/94; 285/261; 403/39; 403/143
[58] Field of Search ...................... 405/224, 195, 202; 285/94, 261; 403/39, 50, 141, 143

[56] References Cited

U.S. PATENT DOCUMENTS

| 2,466,025 | 4/1949 | Hanson | 285/94 X |
| 3,544,137 | 12/1970 | Contreras et al. | 285/261 |
| 3,693,362 | 9/1972 | Leonard et al. | 405/202 |
| 4,266,888 | 5/1981 | Bayer et al. | 405/202 |

FOREIGN PATENT DOCUMENTS

| 2840881 | 4/1980 | Fed. Rep. of Germany | 405/202 |
| 2848006 | 5/1980 | Fed. Rep. of Germany | 405/202 |

Primary Examiner—David H. Corbin
Attorney, Agent, or Firm—McGlew and Tuttle

[57] ABSTRACT

A sea anchoring system for anchoring floating sea stations to a sea bed floor such as on a foundation or a stay block comprises a tension member connected between a floating station and the sea bed foundation or block with a plurality of tension members connected between the bed foundation and the floating station through universal joints. The universal joints include an assembly comprising an inner spherical body and an outer spherical body arranged over and slightly embracing the inner spherical body. The outer spherical body includes an opening on one side and a pin connected to the inner spherical body and extends through this opening and is connected, for example, to the foundation or to the floating body. The outer spherical body has a connection for example to the tension member. The inner and outer spherical bodies have spherical surfaces facing each other and at least one of these surfaces has a lining of a material which permits sliding interengagement with a minimum friction and wear. The outer spherical body has an opening which is advantageously sealed by a casing or bellow structure which may, for example be filled with a liquid such as a lubricant or a controlled amount of water to maintain the integrity of the joint. The outer spherical body is advantageously formed of two hemispherical shells which are flanged and joined together by clamping members.

19 Claims, 4 Drawing Figures

ANCHORING SYSTEM FOR A SEA STATION SUPPORTED ON FLOATING BODIES

FIELD AND BACKGROUND OF THE INVENTION

This invention relates in general to a sea anchoring system for anchoring a floating sea station to a fixed element in a sea bed such as a foundation or a stay.

Aside from prior art sea platforms which are supported by rigid towers anchored to the sea bed (see U.S. Pat. No. 3,522,709, for example), platforms or stations are known which are carried on submerged or semi-submersible floating bodies which are movably anchored to the sea bottom, as a rule through a plurality of hinged connecting arms which extend from the floating bodies in more or less inclined positions. These connecting arms must be relatively very stiff to withstand the forces which are produced by the swell of the sea and by which they are loaded particularly in bending and buckling. That is why these connecting arms are usually designed as heavy lattice girders resistant to bending and buckling (see German OS No. 24 607 89).

Recently, a novel anchoring system has been developed in which the submerged or semi-submerged floating body is held in place by means of tensile force transmitting members which are loaded in tension and secured to a foundation or stay block provided on the sea bottom (see for example, Ocean Industry, Feb. 1980 page 35 et seq.).

As a rule, the members transmitting the tensile forces are designed as tubular elements subjected to and withstanding only tension, wherefore they must be relieved from any bending forces. That is why in such anchoring systems, the ends of the members transmitting the tensile forces must be hinged to the floating bodies and to the foundation or stay blocks in a manner meeting this requirement. In addition, it must be taken into account in the design and construction, that an access to, or inspection of, such hinge points will be impossible, or extremely difficult after the anchoring is accomplished on the sea bottom, in a depth of 200 to 250 meters. A descent to such depths, even by specially trained divers, is hardly possible at the present time and, particularly, no maintenance or repair work can be considered. An inspection would be practical only upon towing the entire station ashore. It is well known what immense costs and difficulties this would involve.

Every care must therefore be taken in the design of such systems to ensure that the anchoring will remain in satisfactory condition for a long period of time, without disturbances and without maintenance.

SUMMARY OF THE INVENTION

The invention is directed to such a design of the anchorage permitting use of the system for at least 10 to 15 years without any inspection or maintanence, without disturbance and with a completely satisfactory function, in depths of 200 to 250 meters below the sea level. This requires a functioning of the mutually movable parts substantially without wear and with a minimum of friction, and an isolation of all of the important parts from sea water or protection against sea water attack. The sea anchoring system for anchoring floating sea stations to a sea bed foundation comprises a tension member connected between the floating station and the sea bed foundation. In accordance with the invention, at least one joint assembly is connected between the floating sea station and the tension member or the foundation and the tension member or both. The joint assembly comprises an inner spherical body and an outer spherical body arranged over and slidably embracing the inner spherical body. A connecting member is connected to the inner spherical body and is adapted to be connected to either the tension member or the foundation or the floating station. A second connecting member is connected to the other spherical body and is adapted to be connected to one of the station, tension member or foundation. Two spherical bodies have spherical surfaces facing each other with at least one of these surfaces having a lining of a material permitting sliding interengagement of the two surfaces with minimum friction and wear. The linings are advantageously contained in a recess, for example on the inner spherical body and a protective or lubricating fluid is advantageously forced under pressure into the lining area or recess and surrounding seals arranged in grooves surrounding the recess permit carryoff of the leakage of the fluid and returned to the fluid circulating system.

The outer spherical part is advantageously made of two hemispherical shell portions which are provided with flanges which are clamped together by clamping elements such as clamping bolts.

An important inventive feature is the arrangement and design of zones lined with a material insuring a minimum of friction and wear. In accordance with the invention, these linings are formed with depressed areas and provided with inlets opening therein and intended for introducing and circulating therethrough a lubricant. Along with the respective conduits, these depressed areas may form a closed system of channels.

A substantial inventive provision is that the depressed areas may be of larger extension, thus may form pockets which are distributed over the circumference of the spherical body.

Further, in accordance with the invention, the linings comprise a flexible plastic having satisfactory sealing and antifriction properties, preferably of PTFE.

An inventive provision of particular importance for ensuring a low friction is that the inlets are connected to a device for circulating the lubricant under high pressure, so that the lubricant is forced through the conduits and depressed areas of the linings under a constant pressure.

Due to this provision, the opposite spherical surfaces of the spherical bodies bear against each other in a floating almost friction-free manner, with the particular advantage that the slide gap between the spherical surfaces filled with the pressurized lubricant can be kept constant. Under the tensile stress to which the joint is subjected in service, a contact pressure occurs only in the upper zone of the spherical bodies, while the lower zone is relieved. In spite of that, slide gaps of equal width can be obtained both in the upper and lower zones, if their width is continuously measured by proper instruments, and the result of measurement is processed to a control signal by means of which the pressure of the lubricant in the upper zone is increased until the width of the slide gap is equalized at all locations of the spherical surfaces. In this way, the two spherical bodies can be exactly centered relative to each other.

Therefore, to obtain a mutual adjustment and centering of the spherical surfaces by keeping the slide gaps constant, it is advantageous, in accordance with the invention, to provide one zone of minimum friction and wear lining above, and one such zone below the equatorial plane of the inner or outer spherical body, with both these zones being supplied with the lubricant under high pressure.

In accordance with a feature of the invention, the lining between the spherical surfaces of the two bodies is bounded by a circumferential sealing lip formed on one of the bodies which has contact with the opposite spherical surface and which includes a circumferential back ring closing the spherical zone containing the lining. The sealing lips are carried on circumferential seal holders which are received in circumferential grooves defined on the associated spherical body and preferably they are biased by circumferential O-rings which are made of highly elastic material.

Another objective of the invention is to shield the important parts of the construction tightly against sea water and, primarily, to prevent sea water from penetrating to the marginal areas of the slide gaps. Further substantial features of the invention therefore are that the outer spherical body has a circular contour and subtends a central angle of 120° at the most through which a pin to be locked to the foundation extends or a connecting device for detachably securing the force transmitting element or tension element. This opening is protected against sea water penetration by means of flexible bellows or by a tight fitting casing. Due to this provision, a hermetic seal against sea water is obtained. It is necessary in this connection, however, to compensate for the sea water pressure from the outside by pressurizing the interior of the shielding structure with a fluid, to avoid an excessive load and prevent the protective bellows from a corresponding deformation. The fluid producing the counter pressure may be air, or another gas, or a liquid. The outer spherical body has an open portion which subtends a second angle of about 120° in which the pin to be locked in the foundation or the connecting elements are attached and it is closed against sea water penetration by the sealing casing type structure which defines an enclosure around the connecting element and the associated spherical body which may be filled with liquid to a selected level height. The level is balanced by applying pressure into the space above the liquid to maintain a properly sealed condition.

The shell enclosing the air body and open downwardly is connected in its upper part to the outer spherical body or the securing element hermetically. However, it must be taken into account that in spite of that, the volume of the air body will gradually diminish, since air particles can escape through the sea water, or because the sealing connection of the shell will become a little permeable to air during the long period of time, which can never be excluded. Since no inspection nor maintenance is possible, some precaution must be taken. The invention therefore provides that to control a seawater level within the shell, a float is provided which is hinged to a signal transmitter and that a regulating valve is actuable by the signal transmitter to control the supply of compressed air from a compressed air source through a supply line into the shell.

The inventive anchorage makes it possible to stay the floating bodies, while utilizing their lifting force, by means of hinged connections by which bending forces which would act on the tensile force transmitting members are almost completely eliminated, so that the design of these members can be based on expected tensile loads only. The features of the invention provide for hinged joints of the force transmitting members, by which the movements of the members subjected to high tensile loads are transmitted to the connected and cooperating constructional parts under extremely low friction and and almost without wear, and which do not require any inspection, not to speak of a maintenance, within a reasonably long space of time.

Accordingly it is an object of the invention to provide a sea anchoring system for anchoring floating sea stations to a sea bed which includes one or more tension elements connected between the sea bed and the sea station through a pivot joint which includes an inner spherical body with an outer spherical body pivotal on the inner spherical body each having spherical surfaces which are in sliding contact with one of them having a lining which permits sliding with minimum friction and wear.

A further object of the invention is to provide a sea anchoring system as well as a universal joint construction for a sea anchoring system which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
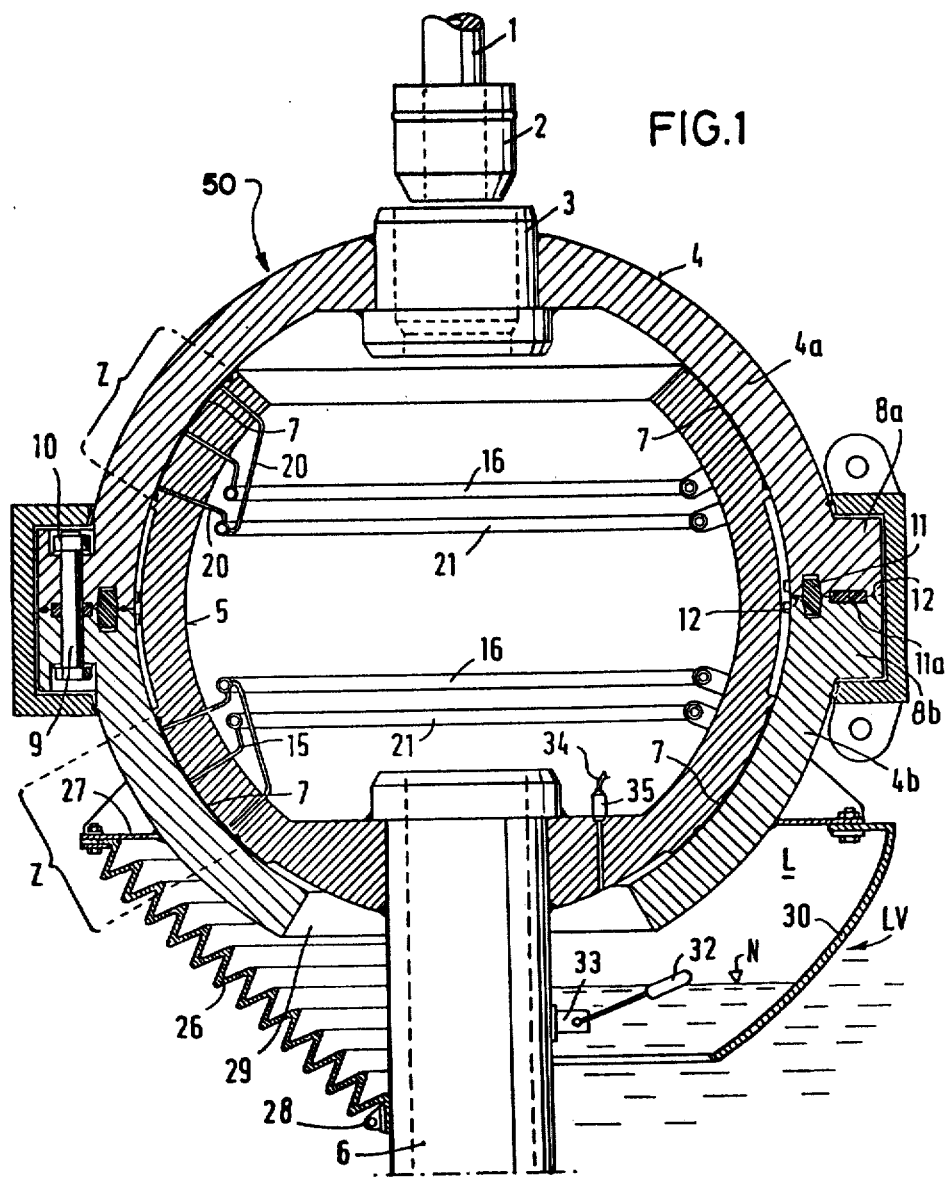
FIG. 1 is a sectional view of an inventive movable joint and anchoring construction, also showing two different embodiments for shielding against sea water.

Referring to the drawings in particular, the invention embodied therein comprises a sea anchoring system for anchoring a floating sea station H having a top platform P to a sea bed such as through foundation means in the form of fixed foundation members F or stay blocks W. The system comprises a tension member or force transmitting element 1 which is connected between the floating sea station H and the foundation at the sea bed through one or more universal joints or joint assemblies generally designated 50. Embodiments 50 and 50' of the universal joints are shown in FIGS. 1 and 2 and each of these embodiments are shown with further alternate design constructions of sealing casing around the joints.

Figure 2:
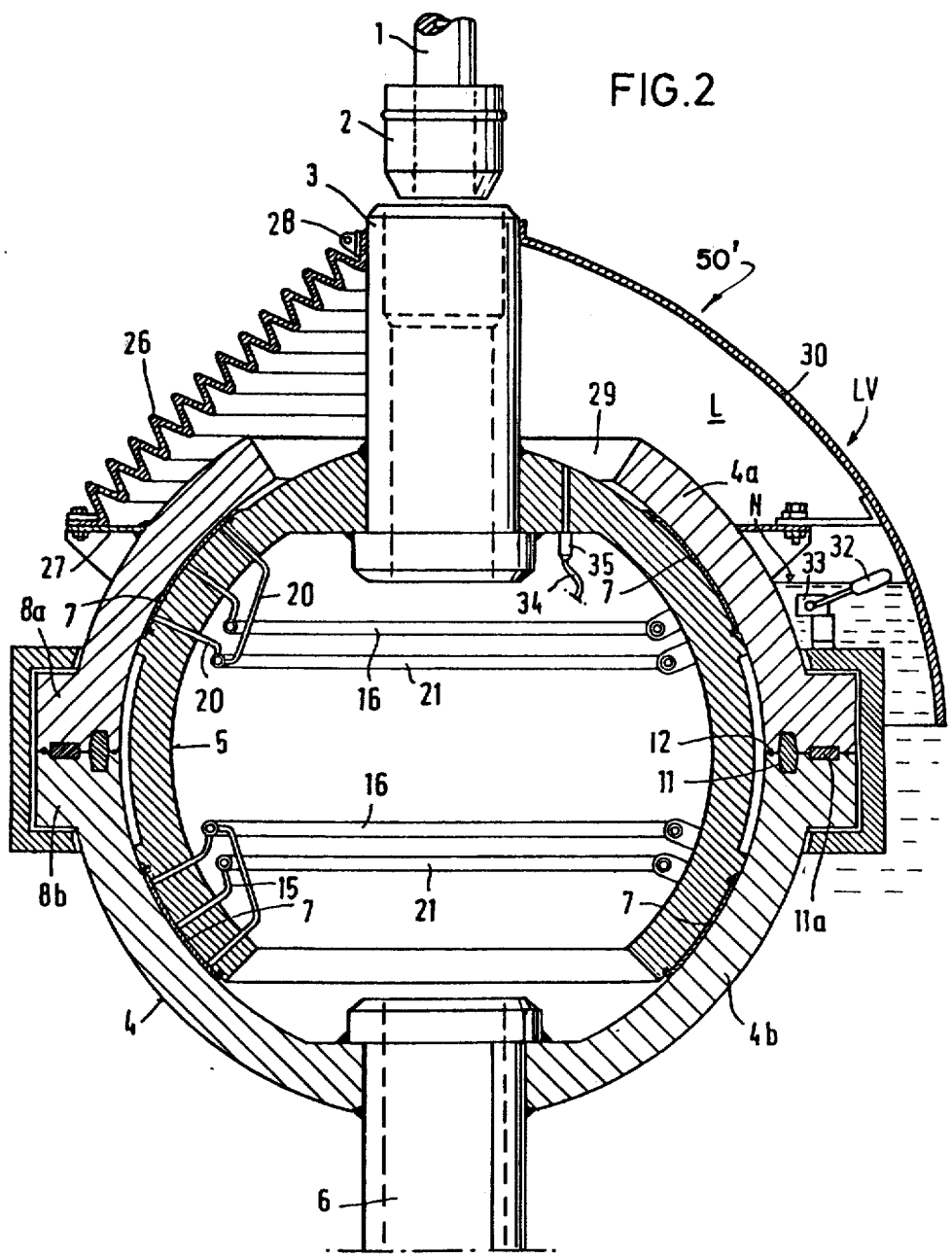
FIG. 2 is a view similar to FIG. 1 of another embodiment of movable joints.

As shown in FIGS. 1 and 2, the joint or anchorage 50 and 50' comprises the member 1 for transmitting the tensile force which is clamped at its end in a sleeve 2 of a movable part of the joint. The sleeve 2 can be positively coupled in a conventional manner (not shown) either to a connecting sleeve 3 made integral with an outer spherical body 4 (FIG. 1) or an inner spherical body 5 (FIG. 2). The inner spherical body 5 or the outer spherical body 4 (as the case may be) is fixedly anchored, by means of a pin 6 integrally joined thereto, in a foundation F or a stay block W (FIG. 4). The inner spherical body 5 includes annular zones or areas Z, one above and one below the horizontal equatorial plane of the body, which are provided with a lining 7 of PTFE. Since PTFE experiences a plastic flow under pressure, lining 7 is applied in corresponding depressed areas (see FIG. 3) so that it is confined in a kind of chamber closed to all sides.

Outer spherical body 4 comprises two hemispherical parts 4a, 4b provided with flanges 8a, 8b through which the entire body is held in assembled state by means of clamping members 9 and 10. In the shown embodiment, clamp bolts 9 and nuts 10 are used as the clamping members. Fitting keys 11 and 11a, and sealing rings 12 are inserted as sealing elements in the joints between the two hemispherical parts 4a and 4b. Outer spherical body covers inner body 5 except for a circle of about 120 of arc from the center of the bodies.

Figure 3:
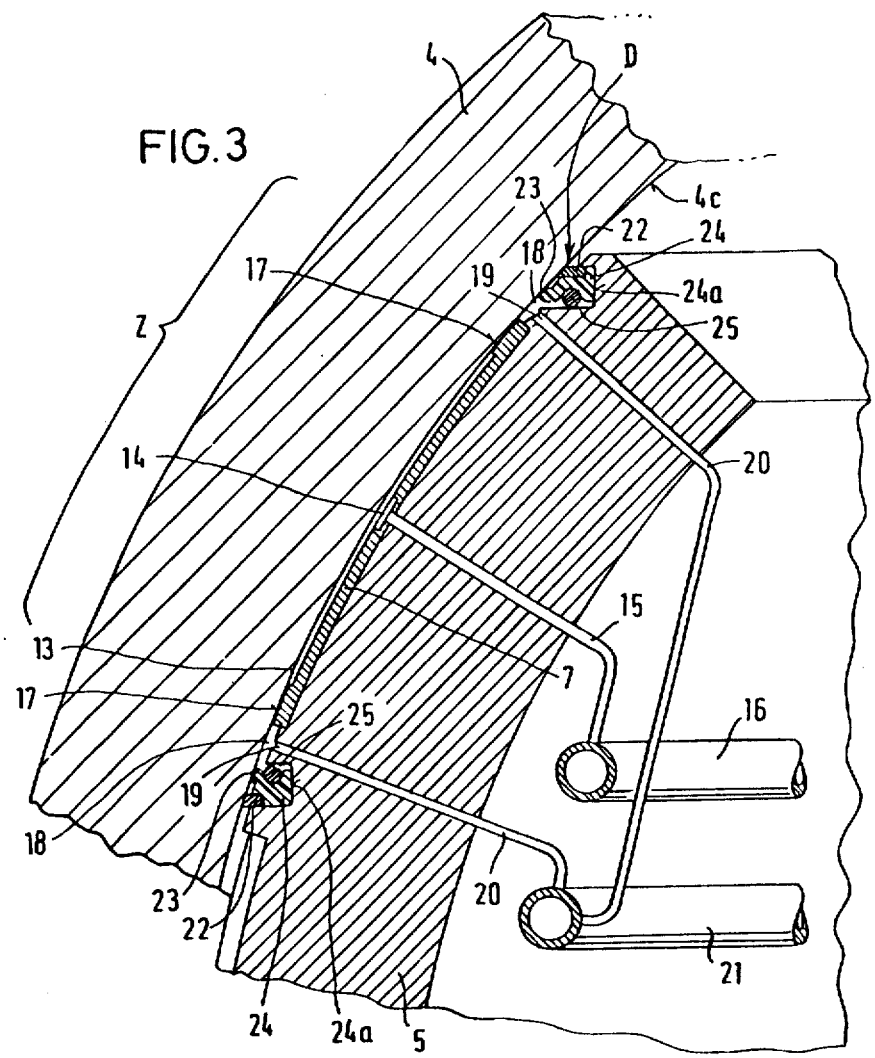
FIG. 3 is an enlarged partial view of a detail of the spherical bodies for either embodiment.
Figure 4:
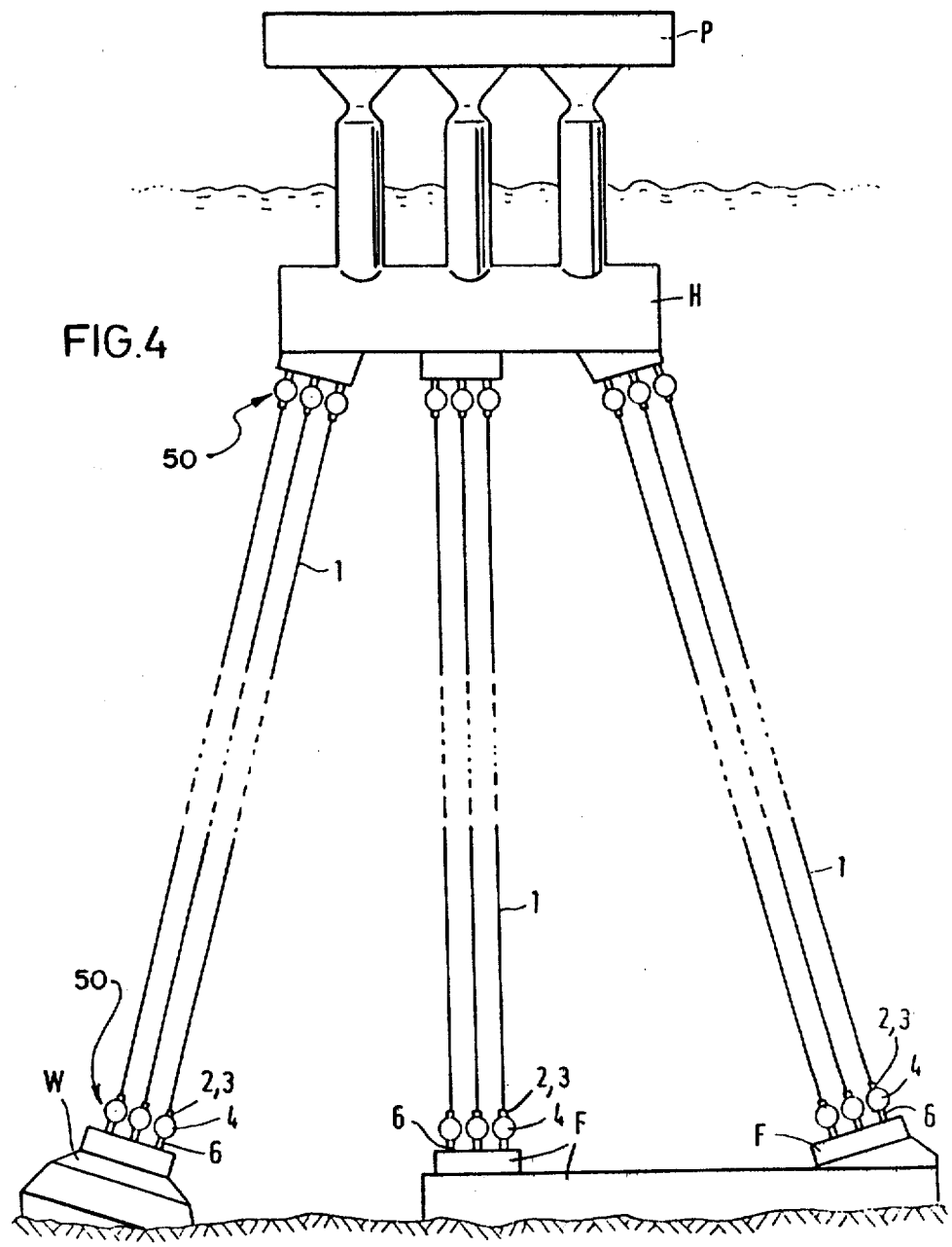
FIG. 4 is a schematic view of an anchoring system with a floating station constructed in accordance with the invention.

As shown in FIG. 3, linings 7 of PTFE comprise a relatively extended depressed area forming a pocket 13, which is bounded on all sides by sealing strips 17, and into which pressurized lubricant can be introduced through an inlet 14. The lubricant is supplied to inlets 14 through supply conduits 15 and circular lines 16 from a high pressure lubricant circulating device (not shown).

FIG. 3 further shows that, inlets 14 are advantageously provided in the central region of the pocket 13. The pockets 13 are arranged in respective zones Z along the circumference of the inner spherical body as adjacent sectors bounded in all directions by strips 17. Upward and downward of sealing strips 17, circumferential leakage channels 18 are provided which, in turn, are bounded in the upward and downward directions, respectively, by circumferential seals D. In these circumferential leakage channels 18, outlets 19 for the lubricant are provided which connect to lubricant discharge conduits 20 leading to circular lines 21 of the of the lubricating system.

Circumferential seals D comprise seal holders 24 which are inserted in circumferential grooves 24a, and are made from a sealing material. Seal holders 24 are provided with sealing lips 23 by which the leakage channels 18 are sealed and which apply against the opposite spherical surface of the outer spherical body. Sealing lips 23 are biased into contact with the opposite surface by circumferential O-rings 25 which also are supported by seal holders 24. O-rings 25 effect a permanent sealing contact between lips 23 and the outer spherical body. Such a contact may be insured by other resilient elements having the same effect. Circumferential seal D is terminated on its upward or downward outside by a circumferential back ring 22 which again is supported by seal holder 24. Back rings 22 protect the seals against penetration of dirt and foreign bodies which may damage sealing lips 23.

This arrangement provides for particularly effective high pressure lubrication of slide zones Z since it makes possible, without the risk of a dangerous leakage, to augment the pressure to an extent such that a floating mounting through the interposed lubricant, of inner spherical body 4 in outer spherical body 5 is produced and maintained, and that the two spherical bodies can exactly be adjusted and centered within each other.

The lubricant which may leak from the pockets 13 past the sealing strips 17 is collected in the circumferential leakage channels 18 and drained through the outlets 19, conduits 20, and lines 21 back to the lubricating circuits.

FIGS. 1 and 2 show two different designs for shielding the opening of outer spherical body 4 against sea water penetration to the slide gap. At the left hand side in each of the figures 1 and 2, a flexible protective bellows 26 is shown which is connected by means of tight fixtures or connectors 27 and 28 respectively, to outer spherical body 4 and to the pin 6 or the device 2,3. The space within bellows 26 is filled, in a conventional manner (not shown), with a pressure fluid, preferably inert gas or a neutral liquid, under a pressure approximately corresponding to the outside pressure of the sea water.

The zone of the circular opening of outer spherical body 4 may also be shielded against sea water by a caisson-type structure LV as shown at the right hand side of figures 1 and 2. In this design, the sealing effect is produced by an air body L which is enclosed in a steel shell 30, 31. At its top, the shell is hermetically connected to outer spherical body 4 (FIG. 1) or securing device 2,3 (FIG. 2), while downwardly, the shell is open so that sea water rises from below to a level balancing the pressure of the enclosed air body.

To compensate for air leakages which might occur in spite of this arrangement, a float 32 is provided which is connected to a signal transmitter 33. Signal transmitter 33 delivers a control signal as soon as the sea water surface N exceeds a preset level. The control signal actuates a regulating valve 35 through which a certain amount of compressed air is supplied through a line 34 from a source of compressed air (not shown), until the preset level L of sea water is reached again.

While specific embodiments of the invention have been shown and described in detail to illustrate the application of the principles of the invention, it will be understood that the invention may be embodied otherwise without departing from such principles.

What is claimed is:

1. A sea anchoring system for anchoring floating sea stations to a sea bed foundation, comprising a force transmitting member connected between the floating station and the sea bed foundation, and at least one joint assembly connected between at least one of the floating sea stations and the force transmitting member and the foundation and the force transmitting member, said joint assembly comprising an inner spherical body, an outer spherical body arranged over and slidably embracing said inner spherical body, a first connecting member connected to one of said floating sea station, said foundation and said force transmitting member, a second connecting member connected to said outer spherical body and adapted to be connected to one of said foundation, said floating sea station and said force transmitting member, said inner and outer spherical bodies having spherical surfaces facing each other with at least one of said spherical surfaces having two spaced apart annular zones each on one side of an equational plane of said at least one of said spherical surfaces, and a lining of a material permitting reduced frictional an wear sliding engagement on each annular zone.

2. A sea anchoring system according to claim 1, wherein said outer spherical body comprises two hemispherical parts, said parts each having flanges which abut the other part, clamping means clamping said hemispherical parts together over said flanges.

3. A sea anchoring system according to claim 2, including sealing elements inserted between said flanges and key means facilitating interengagement of said flanges.

4. A sea anchoring system according to claim 1, wherein said inner spherical body includes depressed areas is said surface thereof for containing said linings and means for supplying lubricant into said depressed areas.

5. A sea anchoring system according to claim 4, including a closed lubricating system connected to said depressed areas.

6. A sea anchoring system according to claim 4, wherein each lining comprising a flexible plastic having sealing and antifriction properties.

7. A sea anchoring system according to claim 4, wherein each lining is made of polytetrofluoethylene.

8. A sea anchoring system according to claim 4, wherein said inner spherical body having said lining includes an inlet connection to said depressed areas for a lubricant and a circulating system connected to said inlet for forcing lubricant to said depressed area under a predetermined pressure to equalize forces on said two annular zones to center said inner body in said outer body.

9. A sea anchoring system according to claim 4, wherein each of the depressed areas is provided with at least one inlet for a pressurized lubricant located to open into the depressed area in a center thereof, a strip for sealing the depressed areas extending around the periphery of each depressed area, a circumferential leakage channel defined around the periphery of said depressed areas located above and below the sealing strips, and circumferential seals bounding said strips, and lubricant outlets provided in the circumferential leakage channels communicating with said inlet.

10. A sea anchoring system according to claim 9, wherein said circumferential seal comprises at least one circumferential sealing lip carried on one of said spherical bodies which is biased into contact with the opposite surface of the other of said spherical bodies and a circumferential back ring closing the spherical zone upwardly and downwardly.

11. A sea anchoring system according to claim 10, including circumferential seal holders extending around each of said depressed areas, said sealing lips being provided on said seal holders, said surfaces having circumferential grooves receiving said seal holders and O-rings disposed between said inner and outer bodies which are made of highly elastic materials and biasing said circumferential seal holders.

12. A sea anchoring system according to claim 10, including back rings secured to said seal holders.

13. A sea anchoring system according to claim 1, wherein said outer spherical body has an opening of circular contour which suptends an angle of about 120° from the center of said body, said second connecting member comprising a pin on said inner spherical body extending out through said opening and a closure member extending over said opening and connected to said pin sealing said pin in said opening.

14. A sea anchoring system according to claim 13, wherein said closure comprises a flexible bellows.

15. A sea anchoring system according to claim 13, wherein said closure comprises a casing structure fixed to said outer body and to said pin.

16. A sea anchoring system according to claim 1, wherein said outer spherical body has an opening, one of said first and second connections extending out through said opening and a sealing enclosure connected to said outer spherical body and to said connection so as to seal said opening.

17. A sea anchoring system according to claim 16, wherein said enclosure comprises a flexible bellows wall extending between said connection and said outer spherical body.

18. A sea anchoring system according to claim 16, wherein said enclosure comprises a solid caisson connected to said outer spherical body and to said connection.

19. A sea anchoring system according to claim 18, wherein said enclosure is filled with a liquid and control conduit for directing liquid into said casing including a float floating on said liquid to provide a flow of liquid into said enclosure when the water level varies within a predetermined value, a compressed air supply connected into said enclosure to supply water to the space above said liquid which is controlled by said float.

* * * * *